(12) United States Patent
Mori et al.

(10) Patent No.: US 9,757,998 B2
(45) Date of Patent: Sep. 12, 2017

(54) WHEEL POSITION DETECTOR AND TIRE INFLATION PRESSURE DETECTOR HAVING THE SAME

(71) Applicant: DENSO CORPORATION, Kariya, Aichi-pref. (JP)

(72) Inventors: Masashi Mori, Obu (JP); Nobuya Watabe, Nagoya (JP); Noriaki Okada, Chiryu (JP); Takatoshi Sekizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 596 days.

(21) Appl. No.: 14/368,384

(22) PCT Filed: Dec. 25, 2012

(86) PCT No.: PCT/JP2012/008255
§ 371 (c)(1),
(2) Date: Jun. 24, 2014

(87) PCT Pub. No.: WO2013/099209
PCT Pub. Date: Jul. 4, 2013

(65) Prior Publication Data
US 2014/0379291 A1 Dec. 25, 2014

(30) Foreign Application Priority Data
Dec. 27, 2011 (JP) ................. 2011-286187

(51) Int. Cl.
*G01P 3/44* (2006.01)
*B60C 23/04* (2006.01)
*G01P 15/00* (2006.01)

(52) U.S. Cl.
CPC ...... *B60C 23/0488* (2013.01); *B60C 23/0416* (2013.01); *B60C 23/0489* (2013.01); *G01P 3/44* (2013.01); *G01P 15/003* (2013.01)

(58) Field of Classification Search
USPC .......................................... 702/138
See application file for complete search history.

(56) References Cited

U.S. PATENT DOCUMENTS 5,602,524 A 2/1997 Mock et al.
6,018,993 A 2/2000 Normann et al.
(Continued)

FOREIGN PATENT DOCUMENTS

DE 102009059788 A1 6/2011
JP H10048233 A 2/1998
(Continued)

OTHER PUBLICATIONS

Office Action dated Dec. 1, 2015 issued in the corresponding CN application No. 201280065264.4 in Chinese with English translation.
(Continued)

*Primary Examiner* — Paul D Lee
(74) *Attorney, Agent, or Firm* — Harness, Dickey & Pierce, P.L.C.

(57) ABSTRACT

In a wheel position detector for a vehicle, a transmitter on each wheel repeatedly transmits a data frame containing identification information when an angle of the transmitter reaches a transmission angle. A receiver for receiving the frame is mounted on a body of a vehicle and performs wheel position detection based on the frame to specify a target wheel from which the frame is transmitted. The receiver acquires a tooth position of a gear rotating with a corresponding wheel when receiving the frame and sets a variation allowable range based on the tooth position. The
(Continued)

receiver specifies the target wheel by determining whether the tooth position falls within the variation allowable range. The transmitter changes the transmission angle at a predetermined time interval.

7 Claims, 8 Drawing Sheets

(56) References Cited

U.S. PATENT DOCUMENTS

| | | | |
|---|---|---|---|
| 6,408,690 B1* | 6/2002 | Young | B60C 23/0408 |
| | | | 73/146.5 |
| 6,489,888 B1 | 12/2002 | Honeck et al. | |
| 6,525,529 B2* | 2/2003 | Murai | G01D 5/2033 |
| | | | 324/166 |
| 6,922,140 B2 | 7/2005 | Hernando et al. | |
| 7,010,968 B2 | 3/2006 | Stewart et al. | |
| 7,336,161 B2 | 2/2008 | Walraet | |
| 7,515,040 B2 | 4/2009 | Mori et al. | |
| 2004/0090322 A1* | 5/2004 | Tsujita | B60C 23/0416 |
| | | | 340/442 |
| 2004/0246117 A1* | 12/2004 | Ogawa | B60C 23/0433 |
| | | | 340/445 |
| 2005/0172707 A1* | 8/2005 | Kanatani | B60C 23/0416 |
| | | | 73/146 |
| 2006/0152353 A1* | 7/2006 | Fischer | B60C 23/0416 |
| | | | 340/442 |
| 2011/0071737 A1 | 3/2011 | Greer et al. | |
| 2012/0242502 A1* | 9/2012 | Steiner | G08C 17/02 |
| | | | 340/870.07 |
| 2012/0259507 A1 | 10/2012 | Fink | |

FOREIGN PATENT DOCUMENTS

| | | |
|---|---|---|
| JP | 3212311 B2 | 9/2001 |
| JP | 2007015491 A | 1/2007 |
| JP | 2010122023 A | 6/2010 |

OTHER PUBLICATIONS

U.S. Appl. No. 14/371,304, filed Jul. 9, 2014, Okada.
International Search Report and Written Opinion for PCT/JP2012/008255, mailed Mar. 25, 2013; ISA/JP.

* cited by examiner

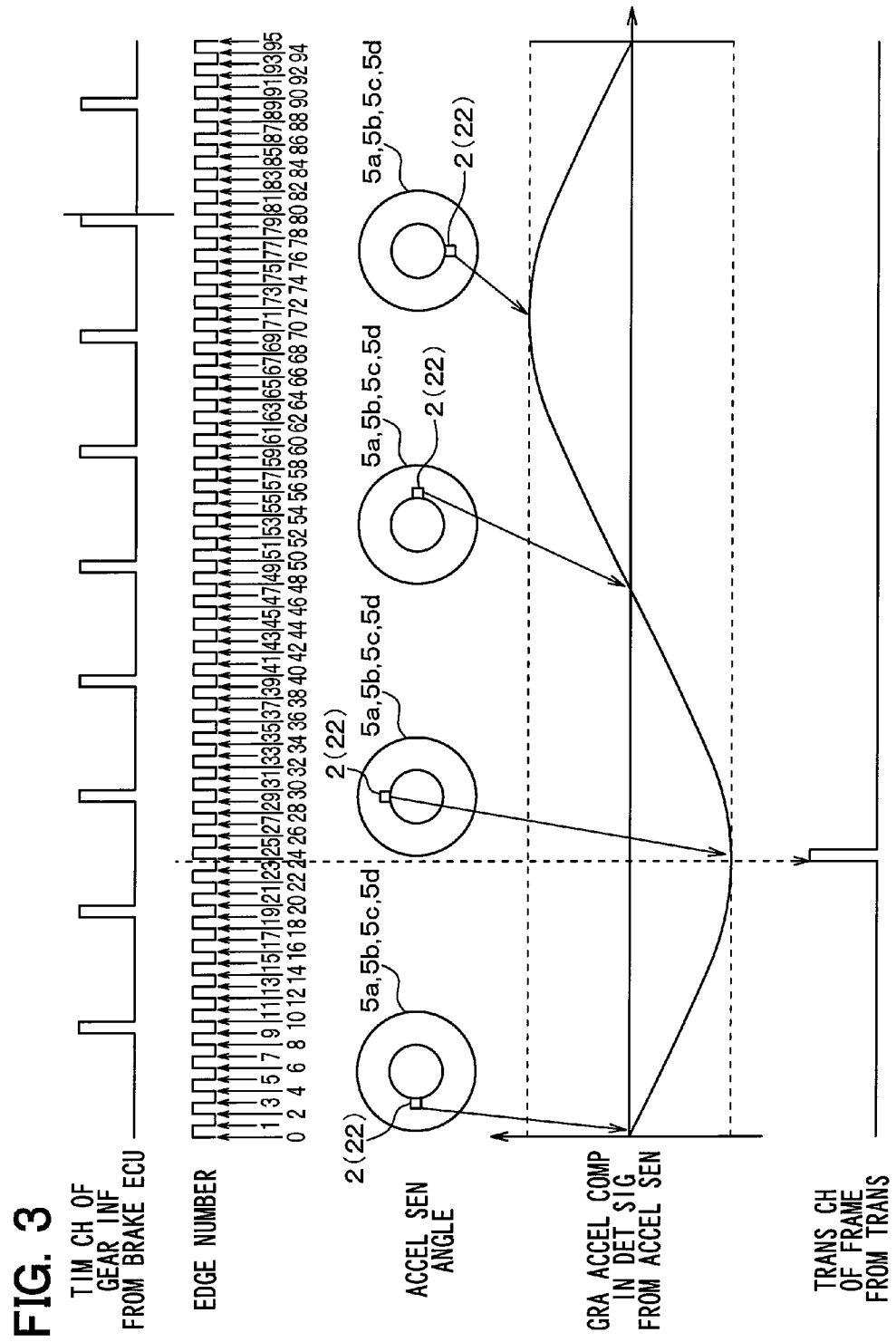

1ST REC

2ND REC

3RD REC

| REC | TIME (t) | TOOTH POS AT REC (0-95) ||||  WH POS SPE LOGIC (TRUE OR FALSE) ||||
|---|---|---|---|---|---|---|---|---|---|
| | | FL | FR | RL | RR | FL | FR | RL | RR |
| REC 1 | 0.0 | 68 | 92 | 62 | 78 | — | — | — | — |
| REC 2 | 5.1 | 56 | 42 | 38 | 8 | TRUE | FALSE | TRUE | FALSE |
| REC 3 | 10.3 | 72 | 26 | 42 | 72 | TRUE | | TRUE | |
| REC 4 | 14.3 | 60 | 62 | 22 | 6 | TRUE | | FALSE | |

| REC | TIME (t) | TOOTH POS AT REC (0-95) |||| WH POS SPE LOGIC (TRUE OR FALSE) ||||
|---|---|---|---|---|---|---|---|---|---|
| | | FL | FR | RL | RR | FL | FR | RL | RR |
| REC 1 | 0.0 | 38 | 68 | 30 | 50 | — | — | — | — |
| REC 2 | 4.1 | 2 | 78 | 80 | 46 | FALSE | TRUE | FALSE | TRUE |
| REC 3 | 8.3 | 42 | 74 | 14 | 28 | | TRUE | | TRUE |
| REC 4 | 12.4 | 88 | 78 | 52 | 22 | | TRUE | | FALSE |

| REC | TIME (t) | TOOTH POS AT REC (0-95) |||| WH POS SPE LOGIC (TRUE OR FALSE) ||||
|---|---|---|---|---|---|---|---|---|---|
| | | FL | FR | RL | RR | FL | FR | RL | RR |
| REC 1 | 0.0 | 62 | 94 | 54 | 76 | — | — | — | — |
| REC 2 | 4.5 | 80 | 66 | 60 | 32 | TRUE | FALSE | TRUE | FALSE |
| REC 3 | 9.0 | 92 | 40 | 64 | 88 | FALSE | | TRUE | |

| REC | TIME (t) | TOOTH POS AT REC (0-95) |||| WH POS SPE LOGIC (TRUE OR FALSE) ||||
|---|---|---|---|---|---|---|---|---|---|
| | | FL | FR | RL | RR | FL | FR | RL | RR |
| REC 1 | 0.0 | 36 | 86 | 24 | 62 | — | — | — | — |
| REC 2 | 4.5 | 0 | 6 | 74 | 64 | FALSE | TRUE | FALSE | TRUE |
| REC 3 | 8.6 | 62 | 24 | 30 | 70 | | FALSE | | TRUE |

FIG. 8A

| ID | ANGLE | PRESSURE | TEMP | ERROR CHECK |
|----|-------|----------|------|-------------|

FIG. 8B

| ID | PRESSURE | TEMP | ERROR CHECK |
|----|----------|------|-------------|

WHEEL POSITION DETECTOR AND TIRE INFLATION PRESSURE DETECTOR HAVING THE SAME

CROSS REFERENCE TO RELATED APPLICATIONS

This application is a U.S. National Phase Application under 35 U.S.C. 371 of International Application No. PCT/JP2012/008255 filed on Dec. 25, 2012 and published as WO 2013/099209 A1 on Jul. 4, 2013. This application is based on Japanese Patent Application No. 2011-286187 filed on Dec. 27, 2011. The disclosures of all of the above applications are incorporated herein by reference.

FIELD

The present disclosure relates to a wheel position detector that automatically detects where a target tire wheel is mounted in a vehicle. The wheel position detector may be used for a direct-type tire inflation pressure detector that detects a tire inflation pressure by directly attaching a transmitter having a pressure sensor to a wheel mounted with a tire, transmitting a detection result from the pressure sensor via the transmitter, and receiving the detection result by a receiver mounted on the vehicle.

BACKGROUND

A direct-type tire inflation pressure detector has been known. This type of tire inflation pressure detector uses a transmitter that is directly attached to a tire wheel of a vehicle. The transmitter has a sensor such as a pressure sensor. An antenna and a receiver are mounted on a body of the vehicle. When the transmitter transmits data including a detection signal from the sensor, the receiver receives the data via the antenna and detects a tire inflation pressure based on the data. The direct-type tire inflation pressure detector determines whether the data is transmitted from the vehicle equipped with the direct-type tire inflation pressure detector or another vehicle. Further, the direct-type tire inflation pressure detector determines which wheel is provided with the transmitter. For this purpose, each data transmitted from the transmitter contains ID information that discriminates between the vehicle and the other vehicle and identifies a wheel to which the transmitter is attached.

In order to locate the transmitter, the receiver needs to pre-register the ID information about each transmitter in association with each wheel position. If tire rotation is performed, the receiver needs to re-register the ID information. For example, patent document 1 proposes a method of automating this registration.

Specifically, in the method according to patent document 1, it is determines whether the wheel reaches a specified rotation position based on an acceleration detection signal from an acceleration sensor included in the transmitter attached to the wheel. The vehicle also detects a rotation position of the wheel based on a wireless signal from the transmitter. The vehicle monitors a change in a relative angle between the rotation positions to specify the wheel position. This method monitors a change in the relative angle between the wheel rotation position detected by the vehicle and the wheel rotation position detected by the wheel based on a deviation in a specified number of data. The method specifies the wheel position by determining that a variation with reference to an initial value exceeds an allowable value.

However, the method described in patent document 1 specifies the wheel position based on whether the variation falls within a variation allowable range defined by the allowable value. Therefore, the method cannot specify the wheel position while the variation falls within the variation allowable range. In addition, a certain large number of data is needed because the method specifies the wheel position based on the standard deviation. The method cannot specify the wheel position until the necessary number of data is acquired. Accordingly, it takes a long time to specify the wheel position.

CITATION LIST

Patent Literature

PTL 1: JP-A-2010-122023

Further, in the conventional method, the wireless signal is transmitted when the wheel reaches a predetermined rotation position. However, there is a possibility that the predetermined rotation position is a Null position, where the wireless signal from the transmitter is less likely to reach the receiver mounted on the body of the vehicle. In such a case, even if the transmitter transmits the wireless signal many times, the wireless signal is less likely to reach the receiver.

SUMMARY

It is an object of the present disclosure to provide a wheel position detector and a tire inflation pressure detector having a wheel position detector capable of accurately specifying a wheel position in a shorter period of time.

According to a first aspect of the present disclosure, a wheel position detector is used for a vehicle which includes a body and wheels mounted on the body. Each wheel is equipped with a tire. The wheel position detector includes transmitters. Each transmitter is mounted on a corresponding wheel and has unique identification information. Each transmitter includes a first control section for generating and transmitting a data frame containing the unique identification information. The wheel position detector further includes a receiver mounted on the body of the vehicle. The receiver includes a second control section and a reception antenna. The second control section receives the frame via the reception antenna from one of the transmitters at a time. The second control section performs wheel position detection, based on the frame, to specify one of the wheels on which the one of the transmitters is mounted. The second control section stores a relationship between the one of the wheels and the unique identification information of the one of the transmitters. The wheel position detector further includes wheel speed sensors. Each wheel speed sensor is provided with a gear rotating with the corresponding wheel. The gear includes teeth having electrical conductivity and intermediate portions alternately arranged with the teeth along an outer periphery of the gear so that a magnetic resistance of the gear can change along the outer periphery. Each wheel speed sensor outputs a tooth detection signal indicative of a passage of each of the teeth. Each transmitter further includes an acceleration sensor. The acceleration sensor outputs an acceleration detection signal indicative of acceleration having a gravity acceleration component varying with a rotation of the corresponding wheel. The first control section detects an angle of the transmitter based on the gravity acceleration component of the acceleration detection signal from the acceleration sensor. The transmitter forms the angle with a central axis of the corresponding wheel and a predetermined reference zero point on a circumference of the corresponding wheel. The first control section repeatedly transmits the frame each time the angle of the transmitter reaches a transmission angle. The first control section changes the transmission angle at a predetermined time interval so that the transmission angle comprises a reference transmission angle and at least one changed transmission angle different from the reference transmission angle. The second control section acquires gear information indicating a tooth position of the gear based on the tooth detection signal from the wheel speed sensor when the receiver receives the frame that is transmitted by the transmitter 2 at the reference transmission angle. The second control section sets a first variation allowable range based on the tooth position. The second control section sets a second variation allowable range when the receiver receives the frame. The second variation allowable range is an overlapping range between the previously set first variation allowable range and the presently set first variation allowable range. The second control section excludes a certain wheel from a candidate of the one of the wheels when the tooth position of the gear rotating with the certain wheel falls outside the second variation allowable range. The second control section registers a remaining wheel as the one of the wheels.

According to a second aspect of the present disclosure, a tire inflation pressure detector includes the wheel position detector according to the first aspect. Each transmitter further includes a sensing section for outputting a pressure detection signal indicative of a tire inflation pressure of the tire of the corresponding wheel. The first control section of each transmitter processes the pressure detection signal to acquire inflation pressure information about the tire inflation pressure and generates the frame in such a manner that the frame contains the pressure inflation information. The second control section of the receiver detects the tire inflation pressure of the tire of the corresponding wheel based on the inflation pressure information contained in the frame.

BRIEF DESCRIPTION OF DRAWINGS

The above and other objects, features and advantages of the present disclosure will become more apparent from the following detailed description made with reference to the accompanying drawings. In the drawings:

FIG. 3 is a timing chart illustrating the wheel position detection;

FIG. 6A illustrates a result of evaluating wheel positions;
FIG. 6B illustrates a result of evaluating wheel positions;
FIG. 6C illustrates a result of evaluating wheel positions;
FIG. 6D illustrates a result of evaluating wheel positions.

FIG. 8A illustrates a structure of a data frame; and
FIG. 8B illustrates another structure of a data frame.

DESCRIPTION OF EMBODIMENTS

Embodiments of the present disclosure will be described below with reference to the drawings.

Embodiment

Figure 1:
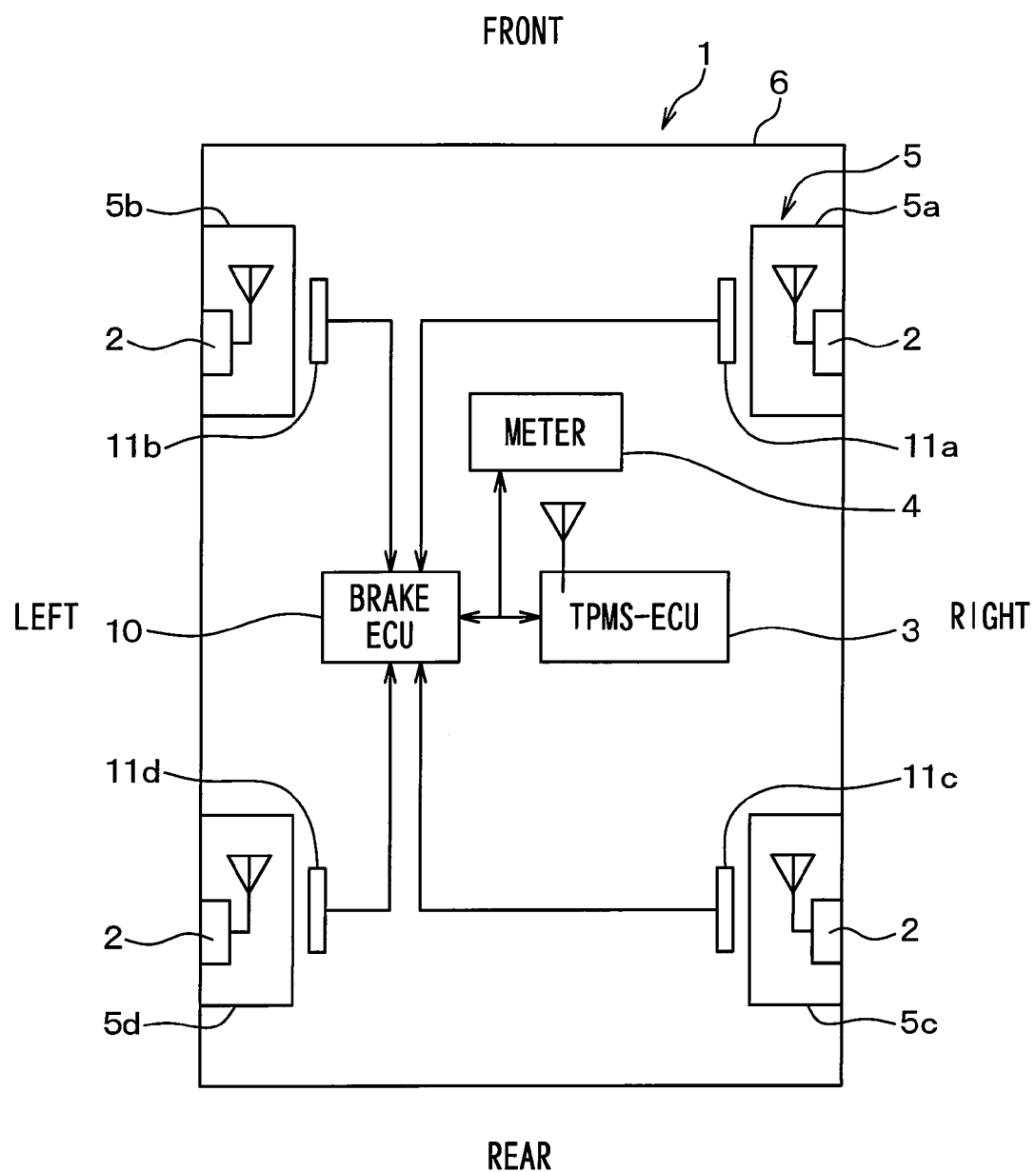
FIG. 1 illustrates an overall configuration of a tire inflation pressure detector including a wheel position detector according to an embodiment.

A tire inflation pressure detector including a wheel position detector according to an embodiment of the present disclosure is described below with reference to FIG. 1. FIG. 1 illustrates an overall configuration of the tire inflation pressure detector. The top of FIG. 1 indicates the front of a vehicle 1. The bottom of FIG. 1 indicates a rear of the vehicle 1.

As illustrated in FIG. 1, the tire inflation pressure detector is attached to the vehicle 1 and includes a transmitter 2, an electronic control unit (ECU) 3 for the tire inflation pressure detector, and a meter 4. The ECU 3 functions as a receiver and is hereinafter referred to as the TPMS-ECU (Tire Pressure Monitoring System ECU) 3. To specify a wheel position, the wheel position detector uses the transmitter 2 and the TPMS-ECU 3. In addition, the wheel position detector acquires gear information from a brake control ECU (hereinafter referred to as the brake ECU) 10. The gear information is generated from detection signals of wheel speed sensors 11a-11d. The wheel speed sensors 11a-11d are respectively provided for tire wheels 5 (5a-5d).

Figure 2A:
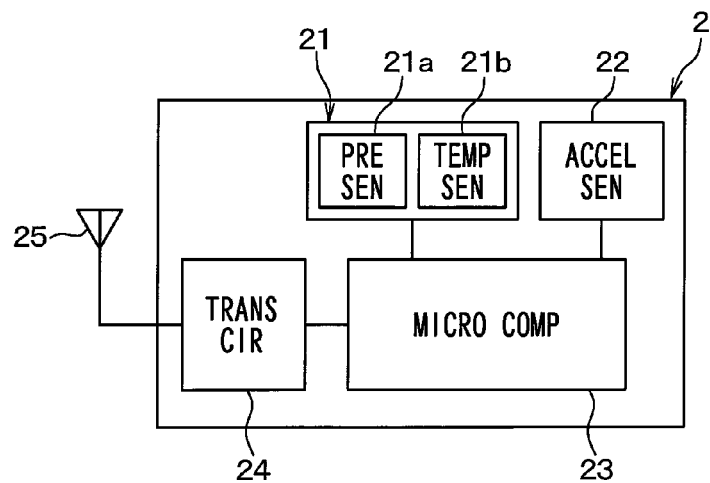
FIG. 2A illustrates a block configuration of a transmitter and a receiver.
Figure 2B:
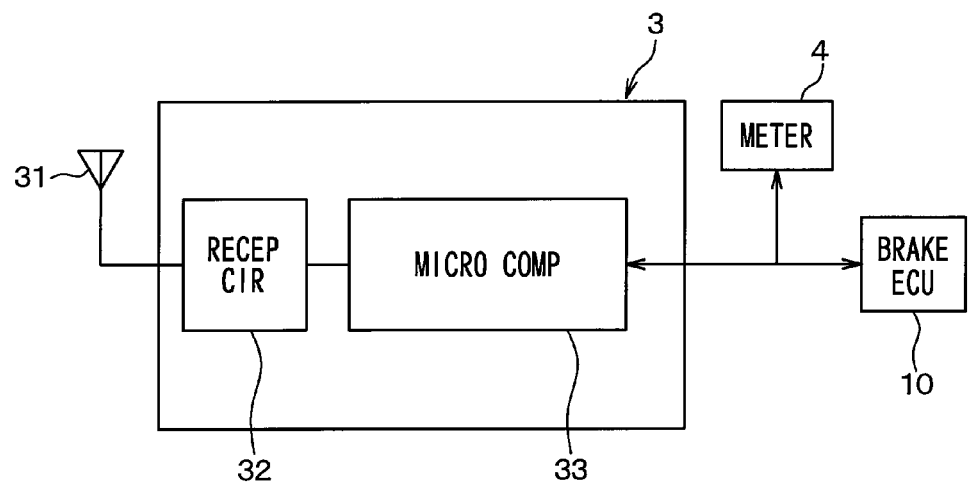
FIG. 2B illustrates a block configuration of a transmitter and a receiver.

As illustrated in FIG. 1, the transmitter 2 is attached to each of the wheels 5a-5d. The transmitter 2 detects inflation pressures of tires mounted on the wheels 5a-5d. The transmitter 2 stores information about the tire inflation pressure as a detection result in a data frame and transmits the frame. The TPMS-ECU 3 is attached to a body 6 of the vehicle 1. The TPMS-ECU 3 receives the frame transmitted from the transmitter 2 and detects a wheel position and a tire inflation pressure by performing various processes and operations based on the detection result stored in the frame. The transmitter 2 modulates the frame according to frequency-shift keying (FSK), for example. The TPMS-ECU 3 demodulates the frame, reads the information stored in the frame, and detects the wheel position and the tire inflation pressure. FIG. 2A illustrates a block diagram of the transmitter 2, and FIG. 2B illustrates a block diagram of the TPMS-ECU 3.

As illustrated in FIG. 2A, the transmitter 2 includes a sensing section 21, an acceleration sensor 22, a microcomputer 23, a transmission circuit 24, and a transmission antenna 25. These components of the transmitter 2 are driven by power supplied from a battery (not shown).

For example, the sensing section 21 includes a diaphragm-type pressure sensor 21a and a temperature sensor 21b. The sensing section 21 outputs a detection signal indicative of the tire inflation pressure and/or a tire temperature. The acceleration sensor 22 detects a position of the sensor itself at the wheels 5a-5d where the transmitter 2 is attached. That is, the acceleration sensor 22 detects a position of the transmitter 2 and a speed of the vehicle 1. For example, according to the embodiment, the acceleration sensor 22 outputs a detection signal indicative of acceleration acting on the rotating wheels 5a-5d in the radial direction of the wheels 5a-5d, namely, in both directions perpendicular to the circumferential direction of the wheels 5a-5d.

The microcomputer 23 includes a control section (first control section) and is configured according to a known technology. The microcomputer 23 performs a predetermined process according to a program stored in an internal memory of the control section. The internal memory of the control section stores separate ID information that contains transmitter identification information to specify each transmitter 2 and vehicle identification information to specify the vehicle 1.

The microcomputer 23 receives a detection signal indicative of the tire inflation pressure from the sensing section 21, processes the signal, and modifies it as needed. Then, the microcomputer 23 stores information about the tire inflation pressure and the transmitter identification information in the frame. The microcomputer 23 monitors the detection signal from the acceleration sensor 22 to detect the speed of the vehicle 1 and to detect the position of each transmitter 2 attached to the wheels 5a-5d. When the microcomputer 23 generates the frame, the microcomputer 23 allows the transmission circuit 24 to transmit the frame to the TPMS-ECU 3 via the transmission antenna 25 based on the speed of the vehicle 1 and the position of the transmitter 2.

Specifically, the microcomputer 23 starts transmitting the frame on when the vehicle 1 is running. The microcomputer 23 repeatedly transmits the frame based on the detection signal from the acceleration sensor 22 each time an angle of the acceleration sensor 22 reaches a transmission angle. The microcomputer 23 determines whether the vehicle is running based on the speed of the vehicle 1. The microcomputer 23 determines whether the angle of the acceleration sensor 22 reaches the transmission angle based on the position of the transmitter 2.

The microcomputer 23 detects the speed of the vehicle 1 using the detection signal from the acceleration sensor 22. The microcomputer 23 determines that the vehicle is running when the speed of the vehicle 1 reaches a predetermined speed (e.g., 5 km/h) or larger. An output of the acceleration sensor 22 includes the centrifugal acceleration, namely, the acceleration based on a centrifugal force. The speed of the vehicle 1 can be calculated by integrating the centrifugal acceleration and multiplying the integral of the centrifugal acceleration by a predetermined coefficient. The microcomputer 23 calculates the centrifugal acceleration by excluding a gravity acceleration component from the output of the acceleration sensor 22 and calculates the speed of the vehicle 1 based on the centrifugal acceleration.

The acceleration sensor 22 outputs detection signals according to rotations of the wheels 5a-5d. While the vehicle 1 is running, the detection signal contains a gravity acceleration component and indicates the amplitude corresponding to the wheel rotation. For example, the detection signal indicates the maximum negative amplitude when the transmitter 2 is positioned just above a central axis of each of the wheels 5a-5d. The detection signal indicates zero amplitude when the transmitter 2 is positioned level with the central axis. The detection signal indicates the maximum positive amplitude when the transmitter 2 is positioned just below the central axis. The angle of the acceleration sensor 22, i.e., an angle of the position of the transmitter 2 can be determined based on the amplitude. For example, the angle of the acceleration sensor 22 can be determined based on the amplitude by assuming that the angle is 0 degree when the acceleration sensor 22 is positioned just above the central axis of each of the wheels 5a-5d.

Each transmitter 2 starts transmitting the frame (i.e., transmits the first frame) at the same time when the speed of the vehicle 1 reaches the predetermined speed or when the acceleration sensor 22 reaches the transmission angle after the speed of the vehicle 1 reaches the predetermined speed. The transmitter 2 repeatedly transmits the frame each time when the angle of the acceleration sensor 22 becomes the angle at which the transmitter 2 transmitted the first frame. Alternatively, the transmitter 2 can transmit the frame only once in a predetermined time period (e.g., 15 seconds) to reduce battery consumption.

The transmission circuit 24 functions as an output section for transmitting the frame, received from the microcomputer 23, to the TPMS-ECU 3 via the transmission antenna 25. For example, the frame is transmitted by using electromagnetic waves of radio frequency.

For example, the transmitter 2 is attached to an inflation valve on each of the wheels 5a-5d in such a manner that the sensing section 21 can be exposed to an inside of the tire, for example. The transmitter 2 detects the tire inflation pressure of a corresponding tire. As described above, when the speed of the vehicle 1 exceeds the predetermined speed, each transmitter 2 repeatedly transmits the frame via the transmission antenna 25 each time the acceleration sensor 22 reaches the transmission angle. The transmitter 2 may always transmit the frame each time the acceleration sensor 22 reaches the transmission. It is desirable to elongate the frame transmission interval to reduce battery consumption. To this end, the transmitter 2 can change from a wheel-positioning mode to a periodic transmission mode when the time required to determine the wheel position elapsed. In this case, in the wheel-positioning mode, the transmitter 2 transmits the frame each time the acceleration sensor 22 reaches transmission angle. In contrast, in the periodic transmission mode, the transmitter 2 transmits the frame at a longer interval (e.g., every one minute), thereby periodically transmitting a signal concerning the tire inflation pressure to the TPMS-ECU 3. For example, a random delay may be provided for each transmitter 2 so that each transmitter 2 can transmit the frame at a different timing. In such an approach, interference of radio waves from the transmitters 2 is prevented so that the TPMS-ECU 3 can surely receive the frames from the transmitters 2.

As illustrated in FIG. 2B, the TPMS-ECU 3 includes a reception antenna 31, a reception circuit 32, and a microcomputer 33. As described later, the TPMS-ECU 3 acquires gear information from the brake ECU 10 via an in-vehicle LAN such as a control area network (CAN), thereby acquiring a tooth position indicated by the number of edges of teeth (or the number of teeth) of a gear rotating with each of the wheels 5a-5d.

The reception antenna 31 receives the frames transmitted from the transmitters 2. The reception antenna 31 is fixed to the body 6 of the vehicle 1. The reception antenna 31 may be provided as an internal antenna incorporated in the TPMS-ECU 3 or provided as an external antenna having a wiring extending from an inside to an outside of the TPMS-ECU 3.

The reception circuit 32 functions as an input section for receiving the frames from the transmitters 2 via the reception antenna 31 and for sending the received frames to the microcomputer 33.

The microcomputer 33 corresponds to a second control section and performs wheel position detection in accordance with a program stored in an internal memory of the microcomputer 33. Specifically, the microcomputer 33 performs the wheel position detection based on a relationship between the gear information acquired from the brake ECU 10 and a reception timing at which the frame is received from the transmitter 2. The microcomputer 33 acquires the gear information from the brake ECU 10 at a predetermined acquisition interval (e.g., 10 ms). The gear information is generated from the wheel speed sensors 11a-11d, which are respectively provided for the wheels 5a-5d.

The gear information indicates the tooth position of the gear rotating with the wheels 5a-5d. For example, each of the wheel speed sensors 11a-11d is configured as an electromagnetic pick-up sensor and placed to face the teeth of the gear. A detection signal outputted from the wheel speed sensors 11a-11d changes each time the tooth of the gear passes the wheel speed sensors 11a-11d. Specifically, the wheel speed sensors 11a-11d output a square-wave pulse as the detection signal each time the tooth of the gear passes the wheel speed sensors 11a-11d. Therefore, rising and falling edges of the square-wave pulse represent that the edge of the tooth of the gear passes the wheel speed sensors 11a-11d. Accordingly, the brake ECU 10 counts the number of the edges of the teeth of the gear passed the wheel speed sensors 11a-11d based on the number of the rising and falling edges of the detection signal from the wheel speed sensors 11a-11d. The brake ECU 10 notifies the microcomputer 33 of the count number as the gear information at the acquisition interval. Thus, the microcomputer 33 can identify when and which tooth of the gear passes the wheel speed sensors 11a-11d based on the gear information.

The count number is reset each time the gear makes one rotation. For example, assuming that the gear has 48 teeth, the edges are numbered from 0 to 95 so that 96 edges can be counted in total. When the count number reaches 95, the brake ECU 10 counts the number of the edges after resetting the count number to 0.

The brake ECU 10 can notify the microcomputer 33 of the number of the teeth passed the wheel speed sensors 11a-11d as the gear information instead of the number of the edges of the teeth passed the wheel speed sensors 11a-11d. Alternatively, the brake ECU 10 can notify the microcomputer 33 of the number of the edges or the number of the teeth that passed the wheel speed sensors 11a-11d during the last acquisition interval, and the microcomputer 33 can add the notified number to the latest count number of the edges or the teeth. In such an approach, the microcomputer 33 can count the number of the edges or the teeth at the acquisition interval. Namely, the microcomputer 33 just needs to be able to finally acquire the number of the edges or the teeth as the gear information at the acquisition interval. The brake ECU 10 resets the count number of the edges or the teeth each time the brake ECU 10 is powered off. The brake ECU 10 restarts counting at the same time when the brake ECU 10 is powered on or when the speed of the vehicle 1 reaches the predetermined speed after the brake ECU 10 is powered on. Therefore, the same tooth is represented by the same number of the edges or the teeth while the brake ECU 10 is powered off.

The microcomputer 33 measures the reception timing when receiving the frame transmitted from each transmitter 2. The microcomputer 33 performs the wheel position detection based on the number of gear edges or teeth which is selected from the acquired number of the edges or the teeth of the gear based on the reception timing. Thus, the microcomputer 33 can perform the wheel position detection that specifies which transmitter 2 is attached to which of the wheels 5a-5d. The wheel position detection will be described in detail later.

Based on a result of the wheel position detection, the microcomputer 33 stores the transmitter identification information along with the position of the wheels 5a-5d to which the transmitter 2 identified by the transmitter identification information is attached. After that, the microcomputer 33 detects the tire inflation pressures of the wheels 5a-5d based on the transmitter identification information stored in the frame transmitted from each transmitter 2 and data about the tire inflation pressure. The microcomputer 33 outputs an electric signal indicative of the tire inflation pressure to the meter 4 via the in-vehicle LAN such as CAN. For example, the microcomputer 33 compares the tire inflation pressure with a predetermined threshold value Th to detect a decrease in the tire inflation pressure. When the microcomputer 33 detects the decrease in the tire inflation pressure, the microcomputer 33 outputs a pressure decrease signal indicative of the decrease in the tire inflation pressure to the meter 4. Thus, the meter 4 is notified of which of the four wheels 5a-5d decreases the tire inflation pressure.

The meter 4 functions as an alarm section. As illustrated in FIG. 1, the meter 4 is located at a position where a driver can view the meter 4. For example, the meter 4 is configured as a meter display included in an instrument panel of the vehicle 1. When receiving the pressure decrease signal from the microcomputer 33 of the TPMS-ECU 3, the meter 4 provides an indication representing which of the wheels 5a-5d is subjected to a decrease in the tire inflation pressure. The meter 4 thereby notifies the driver of a decrease in the tire inflation pressure on a specific wheel.

The following describes operations of the tire inflation pressure detector according to the embodiment. The description below is divided into the wheel position detection and tire inflation pressure detection performed by the tire inflation pressure detector.

Figure 4:
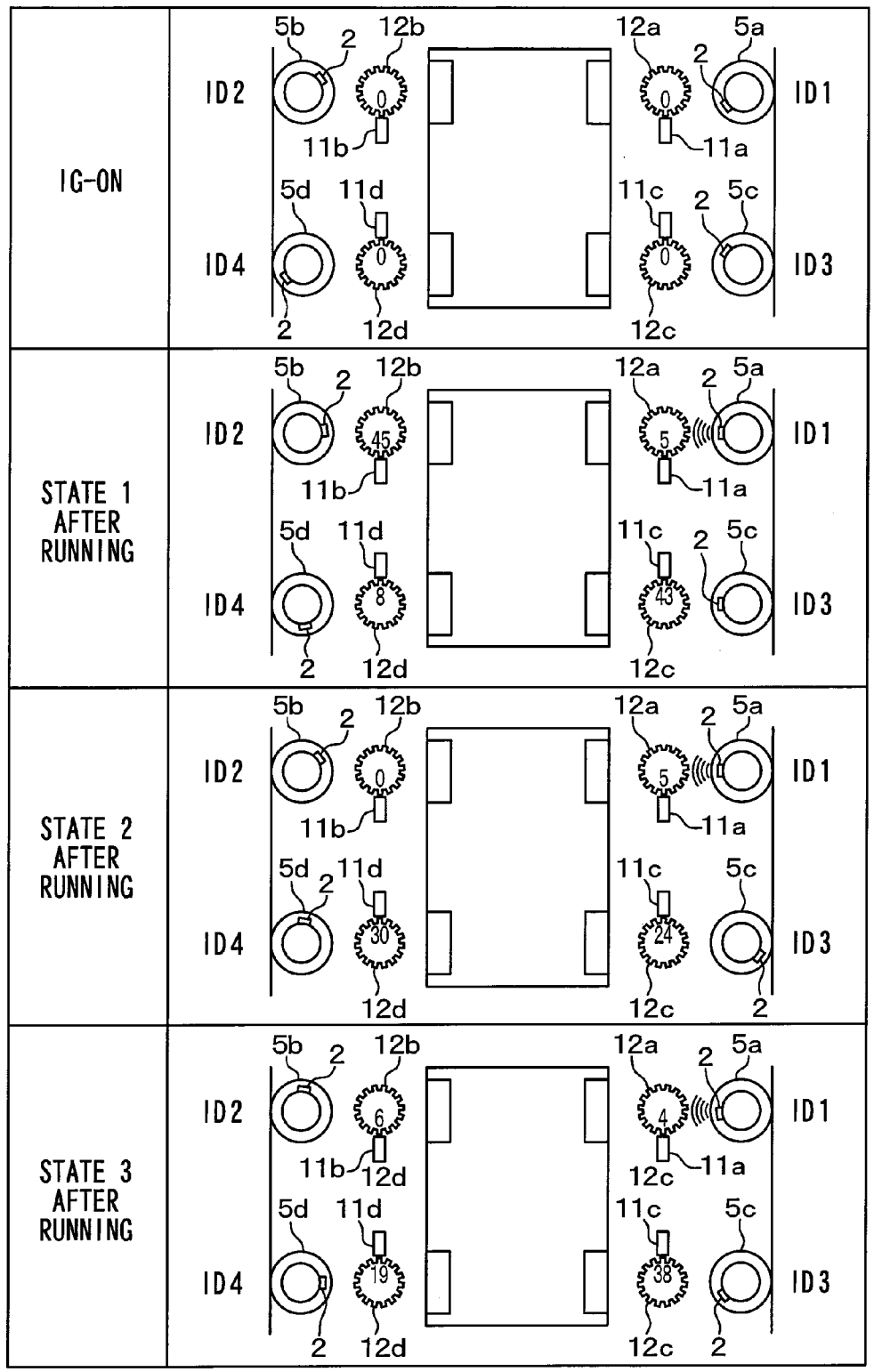
FIG. 4 illustrates changes of gear information.
Figure 5A:
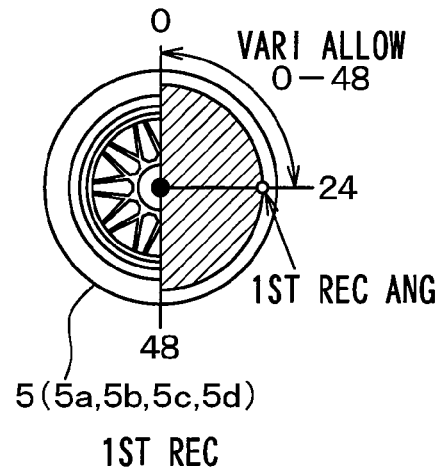
FIG. 5A schematically illustrates the logic to determine a wheel position.
Figure 5B:
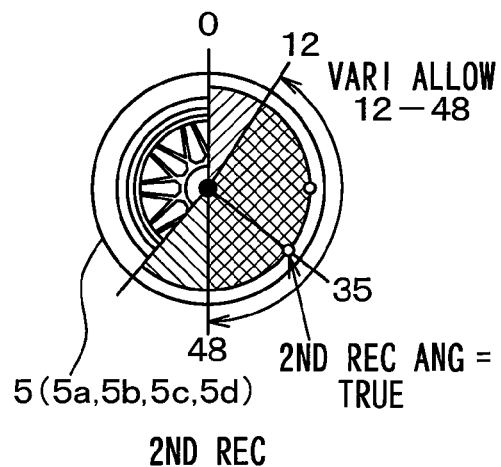
FIG. 5B schematically illustrates the logic to determine a wheel position.
Figure 5C:
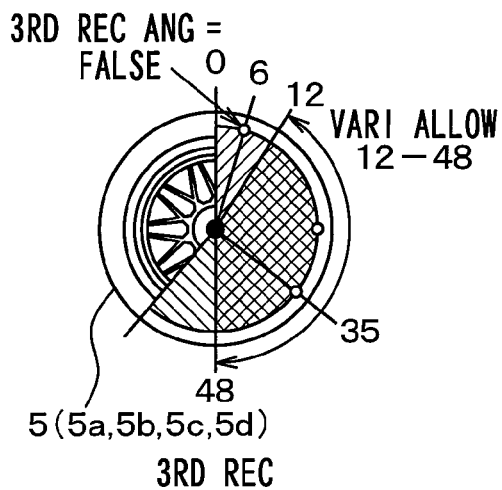
FIG. 5C schematically illustrates the logic to determine a wheel position.

Firstly, the wheel position detection is described. FIG. 3 is a timing chart illustrating the wheel position detection. FIG. 4 illustrates changes in the gear information. FIGS. 5A, 5B, and 5C schematically illustrate a logic (i.e., principle) to detect the wheel position. FIGS. 6A, 6B, 6C, and 6D illustrate results of evaluating the wheel positions. With reference to these drawings, a method of performing the wheel position detection will be described.

On the transmitter 2, the microcomputer 23 monitors the detection signal from the acceleration sensor 22 at a predetermined sampling interval based on the power supplied from the battery. The microcomputer 23 thereby detects the speed of the vehicle 1 and the angle of the acceleration sensor 22 on each of the wheels 5a-5d. When the speed of the vehicle 1 reaches the predetermined speed, the microcomputer 23 repeatedly transmits the frame each time the acceleration sensor 22 reaches the transmission angle. For example, the transmission angle can be an angle of the acceleration sensor 22 immediately after the vehicle speed reaches the predetermined speed. Alternatively, the transmission angle can be a predetermined angle. Thus, the microcomputer 23 repeatedly transmits the frame each time the angle of the acceleration sensor 22 becomes equal to the angle at which the first frame was transmitted.

FIG. 3 shows, from the top to the bottom, a timing to acquire the gear information from the brake ECU 10, the number of gear edges, an angle of the acceleration sensor 22, a gravity acceleration component of the detection signal from the acceleration sensor 22, and a timing to transmit the frame from the transmitter 2. As illustrated in FIG. 3, the gravity acceleration component of the detection signal from the acceleration sensor 22 becomes a sine curve. The angle of the acceleration sensor 22 can be determined based on the sine curve. The frame is transmitted each time the acceleration sensor 22 reaches the same angle based on the sine curve.

The TPMS-ECU 3 acquires the gear information from the brake ECU 10 at the acquisition interval (e.g., 10 ms). The gear information is supplied from the wheel speed sensors 11a-11d respectively provided for the wheels 5a-5d. The TPMS-ECU 3 measures the reception timing when receiving the frame transmitted from each transmitter 2. The TPMS-ECU 3 acquires the number of gear edges or teeth which is selected from the acquired number of the edges or the teeth of the gear based on the reception timing.

The timing to receive the frame transmitted from each transmitter 2 does not always coincide with the interval to acquire the gear information from the brake ECU 10. For this reason, the number of gear edges or teeth indicated in the gear information acquired at the interval closest to the timing to receive the frame can be used as the number of gear edges or teeth at the timing to receive the frame. Namely, the number of gear edges or teeth indicated in the gear information acquired immediately before or after the interval to receive the frame can be used as the number of gear edges or teeth at the timing to receive the frame. The number of the edges or the teeth of the gear at the timing to receive the frame can be calculated by using the number of gear edges or teeth indicated in the gear information acquired immediately before and after the timing to receive the frame. For example, an average of the number of gear edges or teeth that is indicated in the gear information acquired immediately before and after the timing to receive the frame can be used as the number of gear edges or teeth at the timing to receive the frame.

The tire inflation pressure detector repeats the operation to acquire the number of gear edges or teeth at the timing to receive the frame each time the frame is received. The tire inflation pressure detector performs the wheel position detection based on the number of gear edges or teeth acquired at the timing to receive the frame. Specifically, the tire inflation pressure detector performs the wheel position detection by determining whether a variation in the number of gear edges or teeth at the present timing to receive the frame falls within a variation allowable range that is set based on the number of gear edges or teeth acquired at the previous timing.

Assuming that the frame is received from a certain transmitter 2 on any one of the wheels 5a-5d, the certain transmitter 2 transmits the frame each time the acceleration sensor 22 of the certain transmitter 2 reaches the transmission angle. The tooth position almost matches the previous one since the tooth position is indicated by the number of gear edges or teeth at the timing to receive the frame. Consequently, a variation in the number of gear edges or teeth at the timing to receive the frame is small and falls within the variation allowable range. This also applies to a case of receiving the frame from the certain transmitter 2 more than once. That is, regarding the one of wheels 5a-5d on which the certain transmitter 2 is mounted, a variation in the number of gear edges or teeth at the timing to receive the frame falls within the variation allowable range that is set at the first frame reception timing at which the first frame is received from the certain transmitter 2. In contrast, regarding the others of the wheels 5a-5d, the tooth position varies since the frame is transmitted from the transmitter 2 on the others of wheels 5a-5d at timings different from the timing at which the frame is transmitted from the certain transmitter 2.

Specifically, the gears of the wheel speed sensors 11a-11d rotate in conjunction with the wheels 5a-5d, respectively. Therefore, the one of wheels 5a-5d, on which the certain transmitter 2 is mounted, hardly causes a variation in the number of gear edges or teeth at the timing to receive the frame. However, the wheels 5a-5d cannot rotate in exactly the same state because rotation states of the wheels 5a-5d vary due to, for example, a road condition, a turn, and a lane change. Therefore, the others of the wheels 5a-5d cause a variation in the tooth position that is indicated by the number of gear edges or teeth at the timing to receive the frame.

As illustrated in IG-ON of FIG. 4, gears 12a-12d of the respective wheel speed sensors 11a-11d indicate edge count 0 immediately after an ignition switch (IG) of the vehicle 1 is turned ON. After the vehicle 1 starts running, the frame is successively received from a given wheel. A wheel different from the given wheel causes a variation in the tooth position indicated by the number of gear edges or teeth. The tire inflation pressure detector performs the wheel position detection by determining whether the variation falls with the variation allowable range.

A method of setting the variation allowable range is described in detail below with reference to FIGS. 5A-5C. The variation allowable range includes a first variation allowable range and a second variation allowable range. For example, as illustrated in FIG. 5A, assuming that the transmitter 2 is positioned to a first reception angle when the transmitter 2 transmits the frame for the first time, a first variation allowable range is set centered on the first reception angle. In this example, the variation allowable range is set within 180 degrees (i.e., plus or minus 90 degrees) centered on the first reception angle, namely, within plus or minus 24 edges centered on the number of edges at the first frame reception or within plus or minus 12 teeth centered on the number of teeth at the first frame reception.

Then, when the frame is received from the transmitter 2 for the second time, the first variation allowable range is set centered on a second reception angle, which is an angle of the transmitter 2 at the second frame reception. Specifically, the first variation allowable range is set within 180 degrees (plus or minus 90 degrees) centered on the second reception angle. Further, a second variation allowable range is set based the previously set first variation allowable range, which is within 180 degrees (i.e., plus or minus 90 degrees) centered on the first reception angle, and the presently set first variation allowable range, which is within 180 degrees (i.e., plus or minus 90 degrees) centered on the second reception angle. Specifically, the second variation allowable range is set as an overlapping range between the previously set first variation allowable range and the presently set first variation allowable range. In this example, as shown in FIG. 5B, the second variation allowable range is from edge count 12 to edge count 48. In this way, the second variation allowable range can be limited to the overlapping range between the previously set first variation allowable range and the presently set first variation allowable range. If the number of gear edges or teeth at the second frame reception falls within the second variation allowable range set at the second frame reception, i.e., within the first variation allowable range set at the first frame reception, the wheel corresponding to the number of edges or teeth is likely to match the wheel used to transmit the frame and is determined as TRUE.

As illustrated in FIG. 5C, assuming that the number of gear edges or teeth at the third frame reception falls outside the second variation allowable range set at the second frame reception, i.e., outside each of the first variation allowable ranges set at the first and second frame receptions, the wheel corresponding to the number of edges or teeth is likely to differ from the wheel used to transmit the frame and is determined as FALSE. This, the number of gear edges or teeth at the third frame reception is determined as FALSE even if it falls within the first variation allowable range set at the first frame reception but falls outside the second variation allowable range set at the second frame reception. This enables to determine on which of the wheels 5a-5d the transmitter 2 that transmits the frame received by the TPMS-ECU 3 is mounted.

FIG. 6A illustrates a case to specify a target wheel on which the transmitter 2 having transmitter identification information ID1 is mounted. The TPMS-ECU 3 acquires the number of gear edges or teeth of each wheel (front left wheel FL, front right wheel FR, rear left wheel RL, and rear right wheel RR) each time the frame containing the transmitter identification information ID1 is received. The TPMS-ECU 3 stores the acquired number of gear edges or teeth for each wheel. Each time the frame is received, the TPMS-ECU 3 determines whether the acquired number of gear edges or teeth falls within the variation allowable range. The TPMS-ECU 3 excludes a certain wheel from a candidate of the target wheel when the acquired number of gear edges or teeth corresponding to the certain wheel (5a-5d) falls outside the variation allowable range. The TPMS-ECU 3 repeats this procedure each time the frame is received. Then, the TPMS-ECU 3 registers the last remaining wheel as the target wheel. In an example of FIG. 6A, the front right wheel FR, the rear right wheel RR, and the rear left wheel RL are excluded from the candidate of the target wheel in this order. The TPMS-ECU 3 registers the last remaining front left wheel FL as the target wheel on which the transmitter 2 having transmitter identification information ID 1 is mounted.

FIGS. 6B, 6C, and 6D illustrate cases to specify wheels on which the transmitters 1 having transmitter identification information ID2, ID3, and ID4 are mounted, respectively. As illustrated in FIGS. 6B-6D, the TPMS-ECU 3 performs the same procedure as described above for the transmitter identification information ID1. In this manner, the tire inflation pressure detector can specify the wheel mounted with the transmitter 2 that transmitted the frame. The tire inflation pressure detector can specify all the four wheels mounted with the transmitters 2.

As described above, based on the frame transmitted from the transmitter 2, the TPMS-ECU 3 specifies on which of the wheels 5a-5d the transmitter 2 is mounted. The microcomputer 33 stores the transmitter identification information of the transmitter 2 that transmits the frame in association with the position of the wheel on which the transmitter 2 is mounted.

However, there is a possibility that when the angle of the transmitter 2 reaches the transmission angle, the transmitter 2 is located at a Null position, where the frame transmitted from the transmitter 2 is less likely to reach the TPMS-ECU 3. If this occurs, the TPMS-ECU 3 may receive no frame because the transmitter 2 transmits the frame at the Null position each time the angle of the transmitter 2 reaches the transmission angle. To prevent this advantage, according to the embodiment, the transmission angle is changed at a predetermined time interval (e.g., one minute).

Figure 7A:
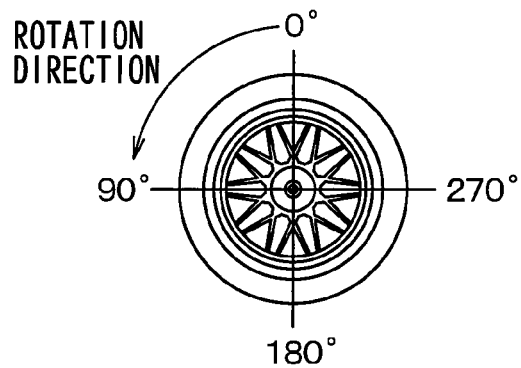
FIG. 7A illustrates an angle of a transmitter on a wheel.
Figure 7B:
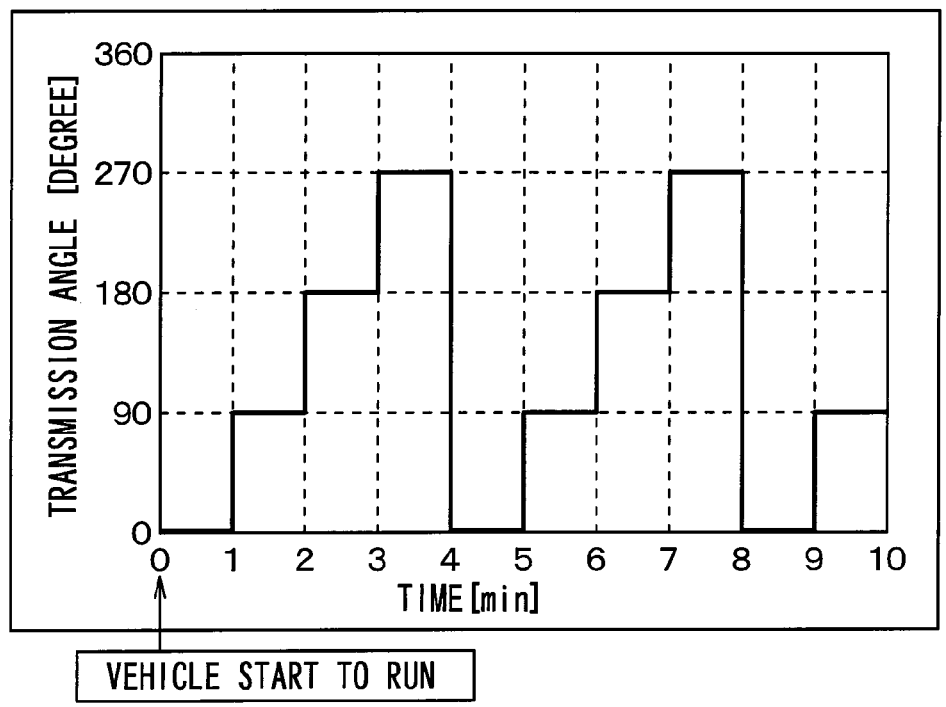
FIG. 7B illustrates a relationship between a transmission angle and a transmission time at which a data frame is transmitted.

For example, the transmitter 2 changes the transmission angle in a manner as shown in FIGS. 7A and 7B. FIG. 7A shows an angle of the transmitter 2 mounted on each of the wheels 5a-5d. As shown in FIG. 7A, the angle of the transmitter 2 is 0 degree when the transmitter 2 is positioned just above the central axis of each of the wheels 5a-5d. The angle of the transmitter 2 is 90 degrees when the transmitter 2 is positioned level with the central axis in the front direction of the vehicle 1. The angle of the transmitter 2 is 180 degrees when the transmitter 2 is positioned just below the central axis. The angle of the transmitter 2 is 270 degrees when the transmitter 2 is positioned level with the central axis in the rear direction of the vehicle 1. FIG. 7B shows a relationship between the transmission angle and a time elapsed since the vehicle 1 starts to run, e.g., since the speed of the vehicle 1 reaches the predetermined speed (e.g., 5 km/h). As shown in FIG. 7B, the transmission angle is set to 0 degree during one minute after the speed of the vehicle 1 reaches the predetermined speed. Therefore, the transmitter 2 transmits the frame each time the angle of the transmitter 2 reaches 0 degree during one minute after the speed of the vehicle 1 reaches the predetermined speed. Then, the transmission angle is changed by 90 degrees in a rotation direction of the wheel and set to 90 degrees during one minute after one minute elapsed since the speed of the vehicle 1 reaches the predetermined speed. Therefore, the transmitter 2 transmits the frame each time the angle of the transmitter 2 reaches 90 degrees during one minute after one minute elapsed since the speed of the vehicle 1 reaches the predetermined speed. Then, the transmission angle is changed by 90 degrees in the rotation direction and set to 180 degrees during one minute after two minutes elapsed since the speed of the vehicle 1 reaches the predetermined speed. Therefore, the transmitter 2 transmits the frame each time the angle of the transmitter 2 reaches 180 degrees during one minute after two minutes elapsed since the speed of the vehicle 1 reaches the predetermined speed. Then, the transmission angle is changed by 90 degrees in the rotation direction and set to 270 degrees during one minute after three minutes elapsed since the speed of the vehicle 1 reaches the predetermined speed. Therefore, the transmitter 2 transmits the frame each time the angle of the transmitter 2 reaches 270 degrees during one minute after three minutes elapsed since the speed of the vehicle 1 reaches the predetermined speed.

In this way, the transmission angle at which the transmitter 2 transmits the frame is changed at a predetermined time interval (e.g., one minute) so that the frame transmitted by the transmitter 2 can be surely received by the TPMS-ECU 3.

When the transmitter 2 changes the transmission angle in the above way, the TPMS-ECU 3 needs to know at which transmission angle the transmitter 2 transmits the frame. A reason for this is that the TPMS-ECU 3 performs the wheel position detection by determining whether the number of gear edges or teeth falls within the variation allowable range based on the frames that are transmitted at the same transmission angle. Therefore, when the transmitter 2 transmits the frame at different transmission angles by changing the transmission angle, the TPMS-ECU 3 needs to know the transmission angle to correct the number of gear edges or teeth acquired at the timings to receive the frames transmitted at different transmission angles in such a manner that the number of gear edges or teeth are acquired at the timings to receive the frames transmitted at the same transmission angles.

For example, as shown in FIG. 8A, transmission angle information (ANGLE) indicating the transmission angle can be contained in the frame transmitted by the transmitter 2 in addition to the transmitter identification information (ID), tire inflation pressure information (PRESSUER), tire temperature information (TEMP), and error check or correction information. In such an approach, when the TPMS-ECU 3 receives the frame, the TPMS-ECU 3 can know that the received frame is transmitted at the transmission angle indicated by the transmission angle information contained in the received frame. In this case, based on the transmission angle information, the TPMS-ECU 3 corrects the number of gear edges or teeth acquired at the timing to receive the frame transmitted at the changed transmission angle by assuming that the frame is transmitted at a reference transmission angle. For example, when the number of teeth of the gear is 48, and the transmission angle is changed by 90 degrees, the number of gear edges acquired at the timing to receive the frame transmitted at the changed transmission angle is corrected by 24 (=(96×90)/360) or the number of gear teeth acquired at the timing to receive the frame transmitted at the changed transmission angle is corrected by 12 (=(48×90)/360). Then, the TPMS-ECU 3 performs the wheel position detection by determining whether the corrected number of gear edges or teeth falls within the variation allowable range.

Alternatively, as shown in FIG. 8B, when transmission angle information is not contained in the frame transmitted by the transmitter 2, the TPMS-ECU 3 can prestore a transmission angle change amount by which the transmitter 2 changes the transmission angle with time. In this case, the TPMS-ECU 3 measures a time elapsed since the frame is transmitted for the first time and estimates the change in the transmission angle after the elapsed time based on the transmission angle change amount and the elapsed time. The TPMS-ECU 3 corrects the number of gear edges or teeth acquired after the elapsed time by the estimated change in the transmission angle. Then, the TPMS-ECU 3 performs the wheel position detection by determining whether the corrected number of gear edges or teeth falls within the variation allowable range.

Upon detection that the speed of the vehicle 1 reaches the predetermined speed (i.e., detection that the vehicle 1 starts to run), the transmitter 2 starts to transmit the frame each time the angle of the transmitter 2 reaches the same transmission angle of, for example, 0 degree, where the acceleration sensor 22 is positioned just above the central axis of each of the wheels 5a-5d. Alternatively, the transmission angle at which the transmitter 2 starts to transmit the frame can be changed by a predetermined angle (e.g., 90 degrees) each time the transmitter 2 starts to transmit the frame. The TPMS-ECU 3 starts to receive the frame when the speed of the vehicle 1 reaches the predetermined speed. The TPMS-ECU 3 acquires and stores the gear information at the timing to receive the frame. The TPMS-ECU 3 erases the stored gear information when the speed of the vehicle 1 decreases below a threshold speed (e.g., 5 km/h) to determine whether the vehicle 1 stops. When the vehicle 1 restarts to run, the TPMS-ECU 3 performs the wheel position detection as described above to acquire and store new gear information.

After performing the wheel position detection, the tire inflation pressure detector performs the tire inflation pressure detection. Specifically, each transmitter 2 transmits the frame at a predetermined pressure detection interval during the tire inflation pressure detection. The TPMS-ECU 3 receives the frames for the four wheels 5a-5d each time the transmitter 2 transmits the frame. Based on the transmitter identification information contained in each frame, the TPMS-ECU 3 determines which of the transmitters 2 attached to the wheels 5a-5d transmitted the frame. The TPMS-ECU 3 detects the tire inflation pressures of the wheels 5a-5d based on the tire inflation pressure information contained in each frame. Thus, the TPMS-ECU 3 can detect a decrease in the tire inflation pressure of each of the wheels 5a-5d and determine which of the wheels 5a-5d is subjected to a decrease in the tire inflation pressure. The TPMS-ECU 3 notifies the meter 4 of the decrease in the tire inflation pressure. The meter 4 provides an indication representing the decrease in the tire inflation pressure while specifying any of the wheels 5a-5d. The meter 4 thereby notifies the driver of the decrease in the tire inflation pressure on a specific wheel.

As described above, according to the embodiment, the wheel position detector acquires the gear information indicating the tooth positions of the gears 12a-12d based on detection signals from the wheel speed sensors 11a-11d that detect passage of teeth of the gears 12a-12d rotating with the wheels 5a-5d. The variation allowable range is set based on the tooth position at the timing to receive the frame. After the variation allowable range is set, a wheel may indicate the tooth position in excess of the variation allowable range at the timing to receive the frame. The wheel position detector excludes that wheel from the candidate wheels possibly mounted with the transmitter 2 that transmitted the frame. The wheel position detector registers the remaining wheel as the wheel mounted with the transmitter 2 that transmitted the frame. The wheel position detector can specify the wheel positions without using a large amount of data.

A new variation allowable range is assumed an overlap between the variation allowable range based on the tooth position at the timing to receive the frame and the variation allowable range set at the timing to receive the previous frame. The new variation allowable range can be limited to the overlap. Therefore, the wheel position detector can fast and accurately specify wheel positions.

Further, according to the embodiment, in consideration of the Null position, where the frame transmitted from the transmitter 2 is less likely to reach the TPMS-ECU 3, the transmission angle at which the transmitter 2 transmits the frame is changed at a predetermined time interval. In such an approach, even if the transmitter 2 transmits the frame at the transmission angle corresponding to the Null position once, the transmitter 2 can transmit the frame at the changed transmission angle next time. Thus, the frame transmitted by the transmitter 2 can be surely received by the TPMS-ECU 3 so that the wheel positions can be surely specified.

The frame is transmitted when the vehicle speed reaches the predetermined speed. The position of the transmitter 2 on each of the wheels 5a-5d is detected by using the acceleration sensor 22. Thus, the wheel position detector can perform the wheel position detection immediately after the vehicle 1 starts to run, although the wheel position detection is available only after the vehicle 1 starts to run. Further, the wheel position detection can be performed without a trigger device unlike conventional wheel position detection that is performed based on the intensity of a received signal outputted from the trigger device.

Other Embodiments

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiment, the TPMS-ECU 3 corrects the number of gear edges or teeth acquired at the timing to receive the frame transmitted at the changed transmission angle in such a manner that the corrected number corresponds to the number of gear edges or teeth acquired at the timing to receive the frame transmitted at the reference transmission angle. However, it is not always essential to perform such correction. For example, the wheel position detection can be performed by using only the number of gear edges or teeth acquired at the timing to receive the frame transmitted at the same transmission angle such as 0 degree or 90 degrees.

In the embodiment, the transmission angle is changed at a predetermined time interval by an angle of 90 degrees in a rotation direction of the wheel. The angle by which the transmission angle is changed at the predetermined time interval in the rotation direction of the wheel is not limited to 90 degrees and also not limited to a constant value.

In the embodiment, an angle of the acceleration sensor 22 is 0 degree when the acceleration sensor 22 is positioned just above the central axis of each of the wheels 5a-5d. However, this is just an example. The angle of the acceleration sensor 22 can be 0 degree when the acceleration sensor 22 is located at any position on the circumference of each of the wheels 5a-5d.

In the embodiment, the second variation allowable range is changed each time the frame is received in such a manner that the second variation allowable range gradually is narrowed. In contrast, the first variation allowable range, which is set centered on the tooth position, has a constant size. Alternatively, the first variation allowable range can be changed. For example, a variation in tooth positions may increase as the vehicle speed increases. Therefore, the first variation allowable range can be set more appropriately by increasing the first variation allowable range as the vehicle speed increases. Further, increasing the sampling interval for the acceleration sensor 22 to detect the acceleration degrades the timing detection accuracy when the acceleration sensor 22 reaches the transmission angle. Therefore, the first variation allowable range can be set more appropriately by changing the first variation allowable range according to the sampling interval. In this case, since the transmitter 2 keeps track of the sampling cycle, the transmitter 2 can transmit the frame containing data that determines the first variation allowable range size.

In the embodiment, the TPMS-ECU 3 acquires the gear information from the brake ECU 10. However, another ECU may acquire the gear information since the TPMS-ECU 3 can acquire the number of gear tooth edges or teeth as the gear information. A detection signal from the wheel speed sensors 11a-11d may be input to acquire the number of gear tooth edges or teeth from the detection signal. According to the above-mentioned embodiment, the TPMS-ECU 3 and the brake ECU 10 are configured as separate ECUs but may be configured as an integrated ECU. In this case, the ECU is directly supplied with a detection signal from the wheel speed sensors 11a-11d and acquires the number of gear tooth edges or teeth from the detection signal. In this case, the number of gear tooth edges or teeth can be always acquired. The wheel position detection can be performed based on the gear information just at the frame reception timing unlike the case of acquiring the information at the specified cycle.

While the above-mentioned embodiment has described the wheel position detector provided for the vehicle 1 having the four wheels 5a-5d, the disclosure is also applicable to a vehicle having more wheels.

According to the disclosure, the wheel speed sensors 11a-11d just need to detect the passage of teeth of gears rotating with the wheels 5a-5d. Therefore, the gear just needs to be configured to provide different magnetic resistances by alternating a tooth having a conductive outer periphery and a portion between teeth. The gear is not limited to a general structure whose outer periphery is configured as an indented outer edge and forms a succession of conductive protrusions and non-conductive spaces. The gear includes a rotor switch whose outer periphery is configured as a conductive portion and a non-conductive insulator (see JP-A-H10-1998-048233), for example.

What is claimed is:

1. A wheel position detector for a vehicle, the vehicle including a body and a plurality of wheels mounted on the body, each wheel equipped with a tire, the wheel position detector comprising:

a plurality of transmitters, each transmitter mounted on a corresponding wheel and having unique identification information, each transmitter including a first control section for generating and transmitting a data frame containing the unique identification information;

a receiver mounted on the body of the vehicle and including a second control section and a reception antenna, the second control section configured to receive the frame via the reception antenna from one of the plurality of transmitters at a time, the second control section configured to perform wheel position detection, based on the frame, to specify one of the plurality of wheels on which the one of the plurality of transmitters is mounted, the second control section configured to store a relationship between the one of the plurality of wheels and the unique identification information of the one of the plurality of transmitters, and a plurality of wheel speed sensors, each wheel speed sensor provided with a gear rotating with the corresponding wheel, the gear including a plurality of teeth having electrical conductivity and a plurality of intermediate portions alternately arranged with the plurality of teeth along an outer periphery of the gear so that a magnetic resistance of the gear changes along the outer periphery, each wheel speed sensor configured to output a tooth detection signal indicative of a passage of each of the plurality of teeth, wherein each transmitter further includes an acceleration sensor configured to output an acceleration detection signal indicative of acceleration having a gravity acceleration component varying with a rotation of the corresponding wheel, the first control section detects an angle of the transmitter based on the gravity acceleration component of the acceleration detection signal from the acceleration sensor, the transmitter forms the angle with a central axis of the corresponding wheel and a predetermined reference zero point on a circumference of the corresponding wheel, the first control section repeatedly transmits the frame each time the angle of the transmitter reaches a transmission angle, the first control section changes the transmission angle at a predetermined time interval so that the transmission angle comprises a reference transmission angle and at least one changed transmission angle different from the reference transmission angle, the second control section acquires gear information indicating a tooth position of the gear based on the tooth detection signal from the wheel speed sensor when the receiver receives the frame that is transmitted by the transmitter at the reference transmission angle, the second control section sets a first variation allowable range based on the tooth position, the second control section sets a second variation allowable range when the receiver receives the frame, the second variation allowable range is an overlapping range between the first variation allowable range which is previously set and the first variation allowable range which is presently set, the second control section excludes a certain wheel from a candidate of the one of the plurality of wheels when the tooth position of the gear rotating with the certain wheel falls outside the second variation allowable range, and the second control section registers a remaining wheel as the one of the plurality of wheels.

2. The wheel position detector according to claim 1, wherein the second control section acquires the gear information indicating the tooth position when the receiver receives the frame that is transmitted by the transmitter at each of the reference transmission angle and the changed transmission angle, the second control section corrects the tooth position acquired when the receiver receives the frame transmitted at the changed transmission angle based on an angle difference between the reference transmission angle and the changed transmission angle in such a manner that the corrected tooth position corresponds to the tooth position acquired when the receiver receives the frame transmitted at the reference transmission angle, and the second control section excludes the certain wheel from the candidate when the corrected tooth position falls outside the second variation allowable range.

3. The wheel position detector according to claim 2, wherein the first control section changes the transmission angle at the predetermined time interval so that the changed transmission angle becomes different from the reference transmission angle by a predetermined angle in a rotation direction of each wheel, the second control section prestores the predetermined angle and measures a time elapsed since the angle of the transmitter reaches the reference transmission angle, and the second control section estimates the angle difference between the reference transmission angle and the changed transmission angle based on the prestored predetermined angle and the measured elapsed time.

4. The wheel position detector according to claim 1, wherein the first control section generates the frame in such a manner that the frame contains transmission angle information indicative of the transmission angle at which the frame is transmitted, and the second control section estimates the angle difference between the reference transmission angle and the changed transmission angle based on the transmission angle information.

5. The wheel position detector according to claim 1, wherein the second control section sets the first variation allowable range in such a manner that the first variation allowable range increases with an increase in a speed of the vehicle.

6. The wheel position detector according to claim 1, wherein the first control section generates the frame in such a manner that the frame contains variation allowable range information indicative of a size of the first variation allowable range, and the second control section sets the first variation allowable range based on the variation allowable range information.

7. A tire inflation pressure detector comprising:

the wheel position detector according to claim 1, wherein each transmitter further includes a sensing section for outputting a pressure detection signal indicative of a tire inflation pressure of the tire of the corresponding wheel, the first control section of each transmitter processes the pressure detection signal to acquire inflation pressure information about the tire inflation pressure and generates the frame in such a manner that the frame contains the pressure inflation information, and the second control section of the receiver detects the tire inflation pressure of the tire of the corresponding wheel based on the inflation pressure information contained in the frame.

* * * * *